United States Patent
Korn

(10) Patent No.: US 8,830,713 B2
(45) Date of Patent: Sep. 9, 2014

(54) METHOD AND APPARATUS FOR OPERATING A CONVERTER CIRCUIT HAVING PLURAL INPUT AND OUTPUT PHASE CONNECTIONS AND PLURAL TWO-POLE SWITCHING CELLS

(75) Inventor: Arthur Korn, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 13/486,466

(22) Filed: Jun. 1, 2012

(65) Prior Publication Data

US 2012/0256601 A1 Oct. 11, 2012

Related U.S. Application Data

(63) Continuation of application No. PCT/EP2010/067378, filed on Nov. 12, 2010.

(30) Foreign Application Priority Data

Dec. 1, 2009 (EP) ..................................... 09177578

(51) Int. Cl.
*H02M 5/297* (2006.01)
*H02M 1/00* (2006.01)
*H02M 7/483* (2007.01)

(52) U.S. Cl.
CPC ...... *H02M 5/297* (2013.01); *H02M 2001/0003* (2013.01); *H02M 2007/4835* (2013.01)
USPC .............................. 363/163; 363/65; 363/164

(58) Field of Classification Search
CPC ...................................................... H02M 5/29
USPC ............ 363/65, 56.01, 71, 132, 43, 159, 163, 363/164; 323/207
See application file for complete search history.

(56) References Cited

U.S. PATENT DOCUMENTS 6,900,998 B2 5/2005 Erickson et al.
8,461,714 B2 * 6/2013 Winkelkemper et al. ....... 290/55

(Continued)

FOREIGN PATENT DOCUMENTS

DE 10 2005 040543 A1 3/2007
WO WO 03/090331 A2 10/2003

(Continued)

OTHER PUBLICATIONS

Dr. Collins Oates, A Methodology for Developing 'Chainlink' Converters, Sep. 8-10, 2009, IEEE Xplore.*
Kansuke Fujii, A Novel DC-link Voltage Control of PWM-Switched Cascade Cell Multi-Level Inverter Applied to STATCOM, Oct. 2-6, 2005, IEEEXplore, vol. 2, p. 961-967.*

(Continued)

*Primary Examiner* — Gary L Laxton
*Assistant Examiner* — Kyle J Moody
(74) *Attorney, Agent, or Firm* — Buchanan Ingersoll & Rooney

(57) ABSTRACT

A method and apparatus are provided for operating a converter circuit, which includes n input phase connections and p output phase connections, where n≥2 and p≥2, and (n·p) two-pole switching cells for switching at least one positive and negative voltages between the poles. Power semiconductor switches of the switching cells are driven a drive signal. To reduce undesired circulating currents and adjust the mean voltage deviation of capacitive energy storage of all the switching cells to zero, an inductance is connected into each series connection, with a switching cell together with an inductance in each case forming a phase module. For each phase module, the drive signal is formed from a reference signal based on the voltage across the phase module and from a voltage signal across the inductance. The voltage signal is formed from an intermediate setpoint value of the current through the phase module.

11 Claims, 4 Drawing Sheets

(56) References Cited

U.S. PATENT DOCUMENTS

| | | | |
|---|---|---|---|
| 8,687,397 B2* | 4/2014 | Winkelnkemper et al. | 363/148 |
| 2004/0022081 A1* | 2/2004 | Erickson et al. | 363/159 |
| 2005/0083716 A1 | 4/2005 | Marquardt | |
| 2008/0232145 A1 | 9/2008 | Hiller et al. | |
| 2008/0310205 A1 | 12/2008 | Hiller | |
| 2010/0020577 A1 | 1/2010 | Dommaschk et al. | |
| 2010/0067266 A1 | 3/2010 | Dommaschk et al. | |

FOREIGN PATENT DOCUMENTS

| | | |
|---|---|---|
| WO | WO 2007/023064 A1 | 3/2007 |
| WO | WO 2007/033852 A2 | 3/2007 |
| WO | WO 2008/067784 A1 | 6/2008 |
| WO | WO 2008/067788 A1 | 6/2008 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Jun. 14, 2012, in corresponding International Application No. PCT/EP2010/067378. (10 pages).

International Search Report (PCT/ISA/210) issued on Jan. 20, 2012, by the European Patent Office as the International Searching Authority for International Application No. PCT/EP2010/067378.

Search Report issued on Oct. 26, 2010, by the European Patent Office for Application No. 09177578.3.

Antonopoulos et al., "On Dynamics and Voltage Control of the Modular Multilevel Converter", Power Electronics and Applications, Sep. 2009, pp. 1-10.

* cited by examiner

METHOD AND APPARATUS FOR OPERATING A CONVERTER CIRCUIT HAVING PLURAL INPUT AND OUTPUT PHASE CONNECTIONS AND PLURAL TWO-POLE SWITCHING CELLS

RELATED DISCLOSURE APPLICATIONS

This application claims priority as a continuation application under 35 U.S.C. §120 to PCT/EP2010/067378, which was filed as an International Application on Nov. 12, 2010 designating the U.S., and which claims priority to European Application 09177578.3 filed in Europe on Dec. 12, 2009. The entire contents of these applications are hereby incorporated by reference in their entireties.

FIELD

The present disclosure relates to the field of power electronics. More particularly, the present disclosure relates to a method and apparatus for operating a converter circuit.

BACKGROUND INFORMATION

In the past, direct converters, such as matrix converters, had a rather academic significance. However, nowadays, direct converters are gaining importance primarily in industrial applications since an input voltage or an input current with a first amplitude and a first frequency can be converted by means of a direct converter directly into an output voltage or into an output current with a second amplitude and a second frequency without a complicated DC voltage intermediate circuit or a DC intermediate circuit. A direct converter of this kind is specified, for example, in U.S. Pat. No. 6,900,998 B2. In U.S. Pat. No. 6,900,998 B2, the direct converter has n=3 input phase connections and p=3 output phase connections. Thus, the direct converter from U.S. Pat. No. 6,900,998 B2 is of three-phase design at the input end and at the output end. The direct converter from U.S. Pat. No. 6,900,998 B2 also includes nine phase modules having, in each case, a two-pole switching cell for switching a positive and a negative voltage between the poles, with each output phase connection being connected in series to each input phase connection in each case directly by means of a switching cell. A switching cell of this kind has drivable bidirectional power semiconductor switches with a controlled unidirectional current guidance direction and a capacitive energy storage means. The phase modules of the direct converter according to U.S. Pat. No. 6,900,998 B2 contain only switching cells and no inductances. Therefore, the voltage on each branch, that is to say on each two-pole switching cell, cannot be adjusted in such a way that a continuous current flow can be achieved from an input phase connection to an output phase connection, as a result of which it is not possible to actively set the current through the respective branch and through the respective phase module. The currents of the output phase connections of the phase modules are discretely switched to the individual phase modules, that is to say the currents of the individual phase modules describe discontinuous functions which jump in sections between zero and the instantaneous value of the current in the associated output phase connection. The connection and disconnection of the currents to the output phase connections of the phase modules requires a complex control algorithm which is solved by means of complicated tables. Care should be taken here that individual phases must never be shorted to form a voltage mesh since the total voltages of two phase modules are normally not exactly identical. At the same time, the current flow in the connections must never be interrupted, that is to say the phase modules always have to be switched at exactly the same time, which requires a considerable amount of expenditure on control. In addition, the connection and disconnection of the full currents leads to a high effective current (RMS current) with correspondingly high losses in the components and, in particular, in the power semiconductor switches.

The power of a phase module and, in particular, also the power of all switching cells of a phase module can deviate on average from zero for a variety of reasons if the phase module has, for example, a plurality of switching cells. Possible causes can be insufficient control, transient operating states, and specific symmetries between the switching operations and the currents through the phase modules, or else physical differences between individual components. If the mean voltage deviation of the capacitive energy storage means of all the switching cells of a phase module is not equal to zero, the result may be a considerable deviation in the voltage across the phase module, which in turn leads to uncontrolled circulating currents through the phase modules.

Furthermore, no, or only very limited, exchange of electrical energy between individual branches is possible with the direct converter from U.S. Pat. No. 6,900,998 B2. However, if the direct converter were to be in a position to transmit a large quantity of electrical energy, the capacitances of the switching cells of U.S. Pat. No. 6,900,998 B2 have to be of correspondingly large dimensions, which results in an enormous amount of space being required by a direct converter of this kind and in considerable costs. Systems which are designed with direct converters of this kind will therefore likewise have a correspondingly large space requirement and be correspondingly expensive.

WO 2008/067788 A1 discloses a method for operating the converter circuit according to WO 2007/023064 A1 which controls the energy content of the switching cells. The method described in WO 2008/067788 A1 applies only to designs of the converter circuit according to WO 2007/023064 A1 which connect three phases of one system to two phases of another system. "On Dynamics and Voltage Control of the Modular Multilevel Converter", Power Electronics and Applications, 2009, EPE 2009, 13$^{th}$ European Conference on IEEE, Sep. 18, 2009 discloses a further method for operating a converter circuit, in which each phase module has a plurality of two-pole switching cells which are connected to one another in series, and each switching cell has drivable bidirectional power semiconductor switches with a controlled unidirectional current guidance direction and a capacitive energy storage means. Furthermore, a method of this generic type for operating a converter circuit is also disclosed in WO 2008/067784 A1.

SUMMARY

An exemplary embodiment of the present disclosure provides a method for operating a converter circuit. The converter circuit includes n input phase connections and p output phase connections, where n≥2 and p≥2, and (n·p) two-pole switching cells for switching at least one positive and at least one negative voltage between the poles. Each output phase connection is connected in series to each input phase connection by means of a switching cell, respectively, and each switching cell has drivable bidirectional power semiconductor switches with a controlled unidirectional current guidance direction, and a capacitive energy storage means. The exemplary method includes driving the power semiconductor switches of the switching cells by means of a drive signal, and connecting at least one inductance into each series connection, with a switching cell together with an inductance in each case forming a phase module. The exemplary method also includes, for each phase module, forming the drive signal from a reference signal in respect of a voltage across the phase module and from a voltage signal across the inductance. In addition, the exemplary method includes forming the voltage signal across the inductance from an intermediate setpoint value of the current through the phase module.

An exemplary embodiment of the present disclosure provides an apparatus for operating a converter circuit. The converter circuit includes n input phase connections and p output phase connections, where n≥2 and p≥2, and (n·p) two-pole switching cells for switching at least one positive and at least one negative voltage between the poles. Each output phase connection is connected in series to each input phase connection in each case by means of a switching cell, respectively, and each switching cell has drivable bidirectional power semiconductor switches with a controlled unidirectional current guidance direction, and a capacitive energy storage means. The exemplary apparatus includes a drive circuit configured to generate a drive signal. The drive circuit is connected to the power semiconductor switches of the switching cell. The exemplary apparatus also includes at least one inductance connected into each series connection, with a switching cell together with an inductance in each case forming a phase module, and, in respect of each phase module, a sum of a reference signal in respect of a voltage across the phase module and of a voltage signal across the inductance being supplied to the drive circuit for forming the drive signal. In addition, the exemplary apparatus includes, for each phase module, a first calculation unit for forming the voltage signal across the inductance from an intermediate setpoint value of the current through the phase module.

An exemplary embodiment of the present disclosure provides an apparatus for operating a converter circuit. The converter circuit includes n input phase connections and p output phase connections, where n≥2 and p≥2, and (n·p) two-pole switching cells for switching at least one positive and at least one negative voltage between the poles. Each output phase circuit is connected in series to each input phase connection in each case by means of a switching cell, respectively, and each switching cell has drivable bidirectional power semiconductor switches with a controlled unidirectional current guidance direction, and a capacitive energy storage means. The exemplary apparatus includes a drive inductance configured to generate a drive signal. The drive circuit is connected to the power semiconductor switches of the switching cell. The exemplary apparatus also includes at least one voltage connected into each series connection, with a switching cell together with an inductance in each case forming a phase module, and, in respect of each phase module, the sum of a reference signal in respect of the voltage across the phase module and of a voltage signal across the inductance being supplied to the drive circuit for forming the drive signal. In addition, the exemplary apparatus includes, for all the phase modules, a common first calculation unit for forming the voltage signal across the inductance of the respectively associated phase module from an intermediate setpoint value of the current through the phase module.

BRIEF DESCRIPTION OF THE DRAWINGS

Additional refinements, advantages and features of the present disclosure are described in more detail below with reference to exemplary embodiments illustrated in the drawings, in which.

Figure 1:
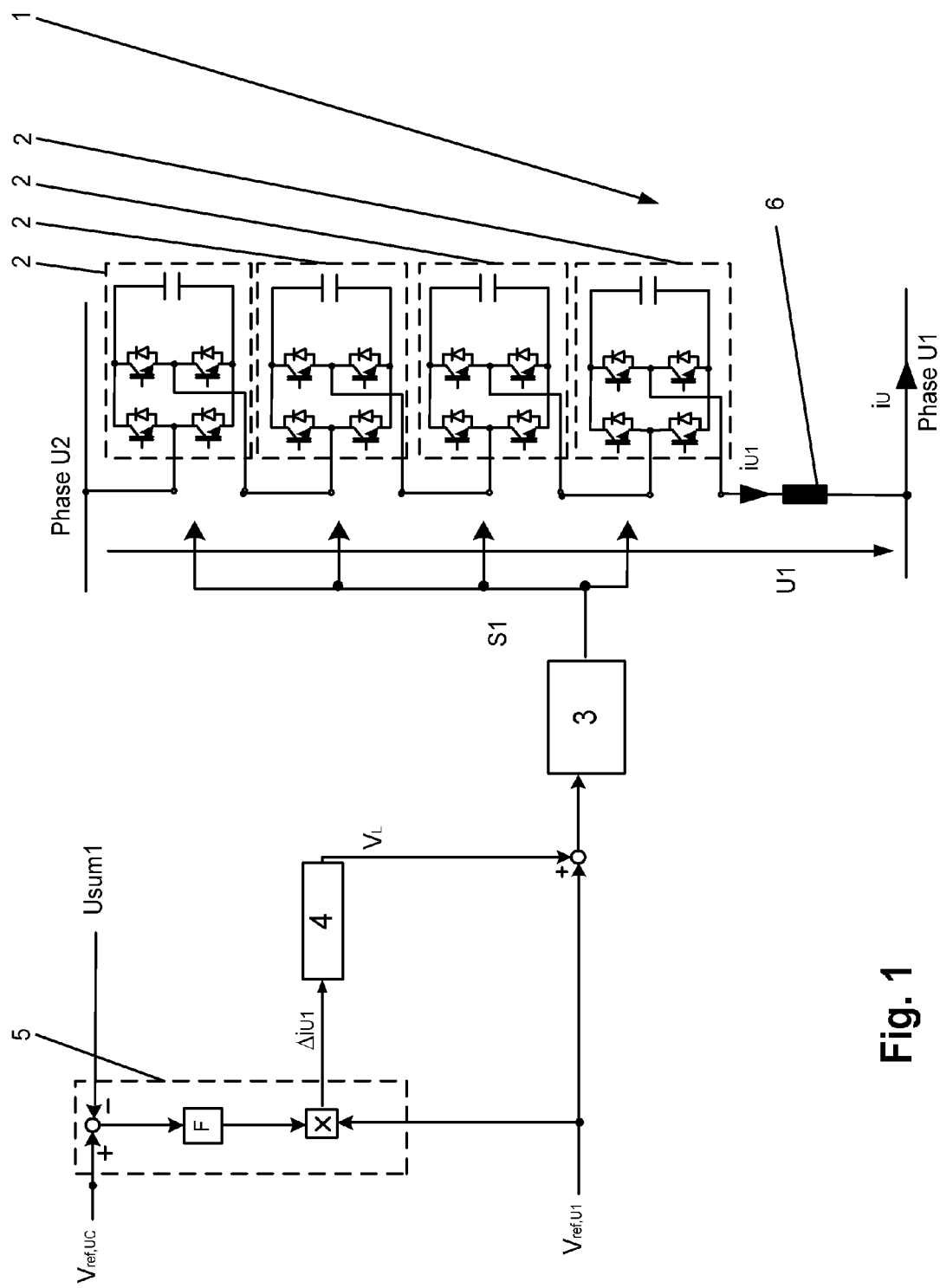
FIG. 1 shows an exemplary embodiment of an apparatus according to the present disclosure for operating a converter circuit, and an apparatus in which a method of the present disclosure for operating a converter circuit can be implemented.

The reference numerals used in the drawings and their meanings are summarized in the List of Designations. In principle, identical parts are provided with identical reference numerals in the figures. The described embodiments represent examples of the subject matter of the present disclosure and do not have a limiting effect.

DETAILED DESCRIPTION

Exemplary embodiments of the present disclosure provide a method for operating a converter circuit, for example, a direct converter, by means of which method undesired circulating currents through the phase modules of the converter circuit can be reduced. Exemplary embodiments of the present disclosure also provide an apparatus with which the method according to the present disclosure can be carried out in a particularly simple manner.

The converter circuit, which may be a direct converter, for example, includes n input phase connections and p output phase connections, where n≥2 and p≥2. The converter circuit also includes n·p two-pole switching cells for switching at least one positive and at least one negative voltage between the poles, with each output phase connection being connected in series to each input phase connection in each case by means of a switching cell. Each switching cell has drivable bidirectional power semiconductor switches with a controlled unidirectional current guidance direction, and a capacitive energy storage means. In accordance with the method, the power semiconductor switches of the switching cells are driven by means of a drive signal. According to an exemplary embodiment of the present disclosure, at least one inductance is now connected into each series connection, with a switching cell together with an inductance in each case forming a phase module, and, for each phase module, the drive signal being formed from a reference signal in respect of the voltage across the phase module and from a voltage signal across the inductance. The voltage signal across the inductance is further formed from an intermediate setpoint value of the current through the phase module. As a result of the respective current intermediate setpoint value at the associated phase module being included in the formation of the voltage signal across the inductance and therefore in the formation of the drive signal, undesired circulating currents through the phase modules of the converter circuit can advantageously be adjusted to zero. In addition, the effect of the circulating currents, which are required for control, on the currents in the output phase connections can advantageously be influenced or accurately predefined. The currents at the input phase connections and at the output phase connections can additionally be distributed to the individual phase modules in continuously varying proportions by the method according to the disclosure. The method of the present disclosure is suitable for converter circuits with any desired number of phases.

The apparatus according to the present disclosure for operating the converter circuit includes a drive circuit, which serves to generate the drive signal, for each phase module. The drive circuit is connected to the power semiconductor switches of the switching cells of the phase module. In respect of each phase module, the sum of the reference signal in respect of the voltage across the phase module and of the voltage signal across the inductance is supplied to the drive circuit for the purpose of forming the drive signal. Finally, in respect of each phase module, a first calculation unit is provided for forming the voltage signal across the inductance from the intermediate setpoint value of the current through the phase module. As an alternative, it is also feasible, for all the phase modules, for a common first calculation unit to be provided for forming the voltage signal across the inductance of the respectively associated phase module from the intermediate setpoint value of the current through the phase module.

The apparatus for operating the converter circuit can therefore be realized in a very simple and cost-effective manner since the circuit complexity can be kept extremely low and, in addition, the apparatus is made up of only a small number of components. Therefore, the method according to the disclosure can be carried out by means of this apparatus in a particularly simple manner.

These and further objects, advantages and features of the present disclosure are disclosed in the following detailed description of exemplary embodiments of the present disclosure in conjunction with the drawings.

Figure 3:
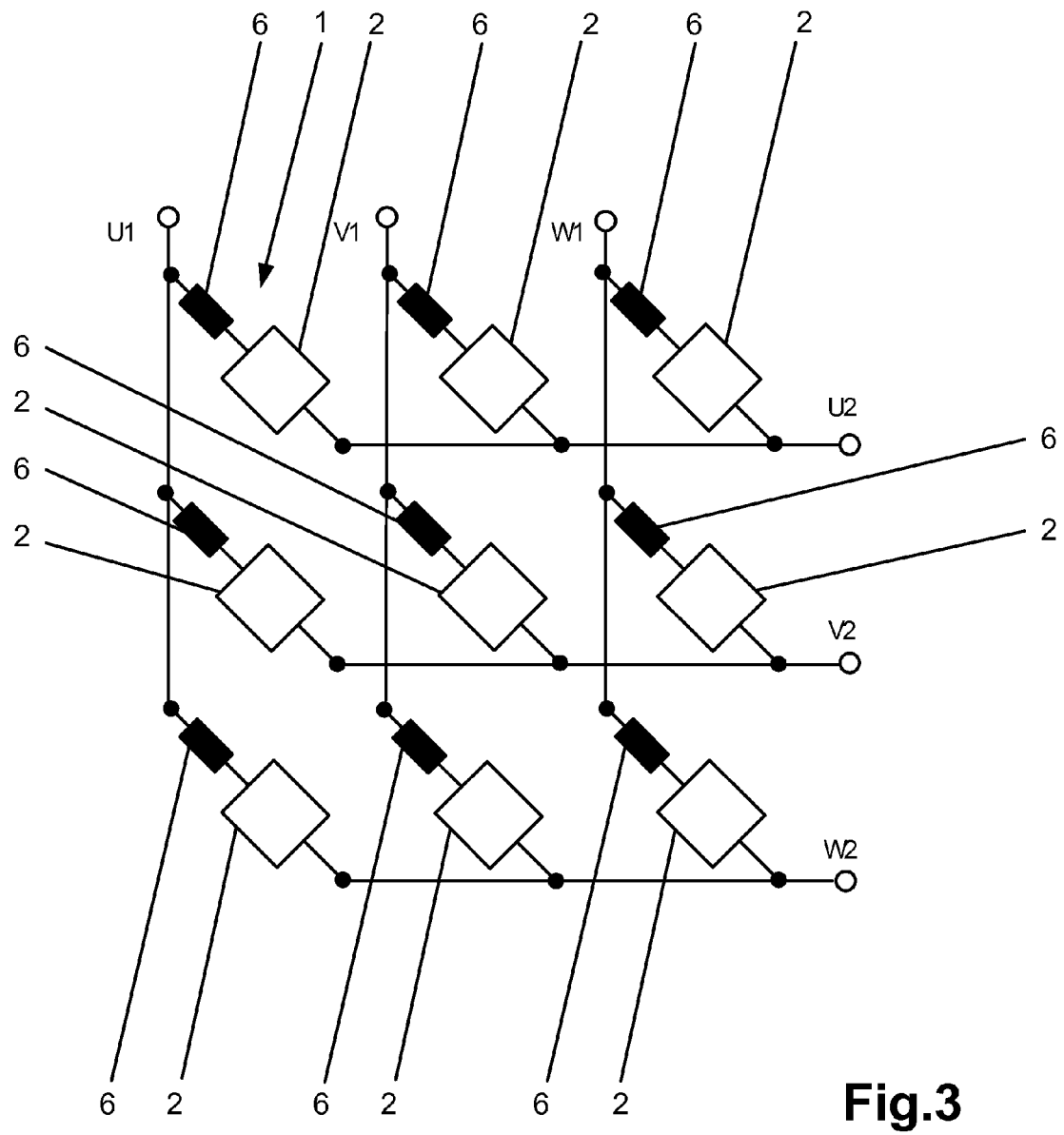
FIG. 3 shows an exemplary embodiment of a converter circuit, for example, of a direct converter.
Figure 4:
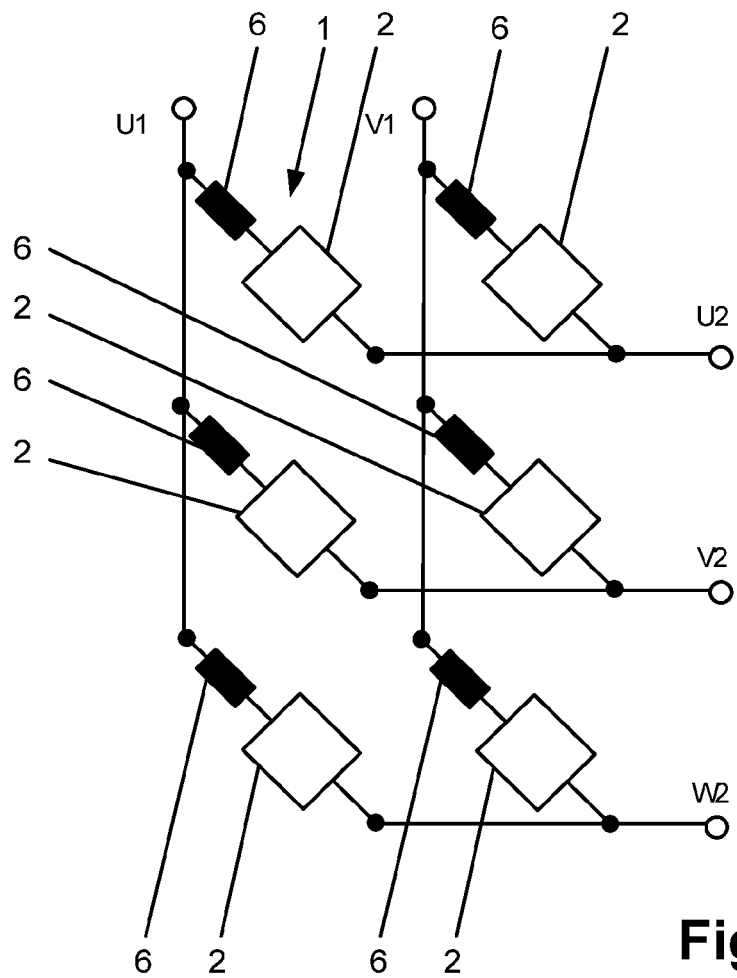
FIG. 4 shows an exemplary embodiment of a converter circuit, for example, of a direct converter.
Figure 5:
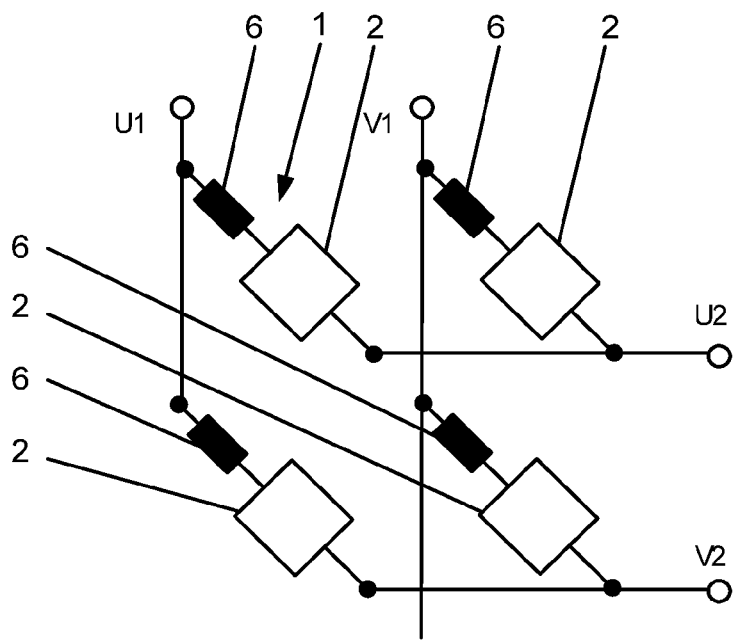
FIG. 5 shows an exemplary embodiment of a converter circuit, for example, of a direct converter.

FIG. 1 shows an exemplary embodiment of an apparatus according to the present disclosure for carrying out the method according to the present disclosure for operating a converter circuit. For the sake of clarity, FIG. 1 shows only one phase module 1 of the converter circuit, which phase module is discussed in greater detail below. The converter circuit, which is, for example, a direct converter which is able to convert an input voltage or an input current with a first amplitude and a first frequency directly into an output voltage or into an output current with a second amplitude and a second frequency, generally includes n input phase connections U1, V1, W1 and p output phase connections U2, V2, W2, where n≥2 and p≥2. The converter circuit, which can be designed as a direct converter, for example, includes n·p two-pole switching cells 2 for switching at least one positive and at least one negative voltage between the poles, with each output phase connection U2, V2, W2 being connected in series to each input phase connection U1, V1, W1 in each case by means of a switching cell 2. This series connection for a converter circuit with n=3 input phase connections U1, V1, W1 and p=3 output phase connections U2, V2, W2 is shown by way of example in FIG. 3. Furthermore, FIG. 4 shows a converter circuit with n=2 input phase connections U1, V1 and p=3 output phase connections U2, V2, W2, and FIG. 3 shows a converter circuit with n=2 input phase connections U1, V1 and p=2 output phase connections U2, V2. Each switching cell 2 generally has drivable bidirectional power semiconductor switches with a controlled unidirectional current guidance direction, and a capacitive energy storage means. The respective drivable power semiconductor switch can be, for example, in the form of a gate turn-off thyristor (GTO) or in the form of an integrated thyristor with a commutated drive electrode (IGCT—Integrated Gate Commutated Thyristor) with a diode which is connected back-to-back in parallel in each case. However, it is also feasible to form a drivable power semiconductor switch, for example, as a power MOSFET with a diode which is additionally connected back-to-back in parallel or as a bipolar transistor with an insulated gate electrode (IGBT) with a diode which is additionally connected back-to-back in parallel.

In line with the method, the power semiconductor switches of the switching cells 2 are driven by means of a drive signal S1 for each phase module 1. The drive signal S1 may be subject to a time delay for each switching cell 2, with the result that each switching cell 2 can advantageously be driven with a time delay.

According to an exemplary embodiment of the present disclosure, at least one inductance 6 is connected into each series connection, that is to say, as mentioned above, into the respective connection between an output phase connection U2, V2, W2 and an input phase connection U1, V1, W1 by means of the associated two-pole switching cell 2, with in each case one switching cell 2 together with an inductance 6 of this kind forming a phase module 1, and, for each phase module 1, the drive signal S1 is formed from a reference signal $V_{ref,U1}$ in respect of the voltage U1 across the phase module 1 and from a voltage signal $V_L$ across the inductance 6. In addition, the voltage signal $V_L$ across the inductance 6 is formed from an intermediate setpoint value $\Delta i_{U1}$ of the current $i_{U1}$ through the phase module 1. The current intermediate setpoint value $\Delta i_{U1}$ is accordingly an intermediate variable. The inductance 6 in each series connection, that is to say in each branch between an input phase connection U1, V1, W1 and an output phase connection U2, V2, W2, advantageously allows a voltage to be set by the switching cells 2 in such a way that a continuous current flow can be achieved from an input phase connection U1, V1, W1 to an output phase connection U2, V2, W2, as a result of which it is possible to actively set the current through the respective branch. Furthermore, virtually any desired exchange of electrical energy between individual branches is possible with the converter circuit. As a result of the respective current intermediate setpoint value $\Delta i_{U1}$ at the associated phase module 1 being included in the formation of the voltage signal $V_L$ across the inductance 6 and therefore in the formation of the respective drive signal S1, undesired circulating currents through the phase module 1 of the converter circuit can advantageously be reduced or adjusted to zero. The above-mentioned method steps advantageously do not cause any undesired change in the currents $i_u$ at the output phase connections U2, V2, W2 of the phase modules 1, that is to say these currents $i_u$ are not influenced in an undesirable manner. In addition, the effect of the circulating currents, which are required for control purposes, on the currents $i_u$ in the output phase connections U2, V2, W2 are advantageously influenced or accurately predefined.

The following formula:

$$V_L = L \cdot \frac{d}{dt} \Delta i_{u1} \qquad [1]$$

is used to form the voltage signal $V_L$ across the inductance 6. Therefore, the current $i_{u1}$ through the phase module 1 is subject to a form of feed forward control.

According to FIG. 1, each switching cell 2 has, by way of example, four drivable bidirectional power semiconductor switches with a controlled unidirectional current guidance direction, which power semiconductor switches are connected in the manner of a bridge circuit, for example, a full-bridge circuit, and a capacitive energy storage means which is connected parallel to the bridge circuit of the power semiconductor switches, with the phase module 1 additionally generally having at least one further two-pole switching cell 2, which is connected into the series connection, for switching at least one positive and at least one negative voltage between the poles, with four switching cells of a phase module 1 being shown by way of example in FIG. 1 in this respect. However, two-pole switching cells 2 which are generally in the form of multilevel circuits and which are able to switch at least one positive and at least one negative voltage between the poles are also feasible. By means of the exchange of electrical energy between individual branches, and therefore between individual switching cells 2, virtually as desired as already mentioned above, the capacitive energy storage means of the switching cells 2 can advantageously be of correspondingly small dimensions in the case of a converter circuit, in particular designed as a direct converter which is intended to be able to transmit large quantities of electrical energy, this resulting in a significant saving in terms of space and a considerable reduction in the costs compared to known direct converters. Systems designed with converter circuits of this kind can therefore likewise have a correspondingly small space requirement and be correspondingly cost-effective. Furthermore, all phase modules 1 form closed voltage meshes at any time. Any voltage differences between the individual switching cells 2 are dropped across the inductances 6. At the same time, the continuous currents through the inductances 6 ensure that the current at the output phase connections U2, V2, W2 of the phase modules 1 is never interrupted.

In accordance with an exemplary embodiment of the converter circuit, for example, in the form of a direct converter, at least one further two-pole switching cell 2 for switching at least one positive and at least one negative voltage between the poles is connected into each series connection, as a result of which the voltage which is to be switched, that is to say the voltage carrying capacity, over the entire series connection between an input phase connection U1, V1, W1 and an output phase connection U2, V2, W2 can advantageously be increased. It is also feasible for at least one further two-pole switching cell 2, for example, formed in the manner described above, for switching at least one positive and at least one negative voltage between the poles to be connected parallel to each switching cell 2. A higher current, that is to say an increased current carrying capacity, through the entire series connection between an input phase connection U1, V1, W1 and an output phase connection U2, V2, W2 can advantageously be achieved. It is also possible for at least one further series circuit of a two-pole switching cell 2 for switching at least one positive and at least one negative voltage between the poles with at least one further inductance 6 to be connected parallel to each series circuit of the switching cell 2 with at least one inductance 6.

In accordance with an exemplary embodiment, a short-circuit element can be connected parallel to each switching cell 2 in order to provide protection in the event of a fault in a switching cell 2.

The mean voltage deviation of the capacitive energy storage means of all the switching cells 2 of a phase module 1 according to the above-mentioned embodiments of a phase module 1 with a plurality of switching cells 2 can also advantageously be adjusted to zero by the respective current intermediate setpoint value $\Delta i_{U1}$ at the associated phase module 1 being included in the formation of the voltage signal $V_L$ across the inductance 6 and therefore in the formation of the drive signal S1.

For each phase module 1, which has a plurality of switching cells 2 according to the embodiments mentioned above, the intermediate setpoint value $\Delta i_{U1}$ of the current $i_{U1}$ through the phase module 1 is formed from a sum Usum1 of the voltages UC1 across the capacitive energy storage means of the switching cells 2 of the phase module 1 and from a sum voltage setpoint value $V_{ref,UC}$. This is done in accordance with the following formula:

$$\Delta i_{u1} = F \cdot (V_{ref,UC} - U\text{sum1}) \cdot V_{ref,U1} \qquad [2]$$

If only a single switching cell 2 is provided for a phase module 1, the sum Usum1 naturally corresponds to the voltage UC1 across the capacitive energy storage means of this individual switching cell 2 of the phase module 1.

According to formula [2], the intermediate setpoint value $\Delta i_{U1}$ of the current $i_{U1}$ through the phase module 1 is additionally formed from a predefinable controller function F. A proportional characteristic can be selected for the controller function F, and therefore the controller function F is selected to be, for example $$F = K$$

where K is a proportionality factor. It goes without saying that it is generally feasible to select any controller characteristic in respect of the controller function F. By selecting the controller function F, it is advantageously possible to predefine a very specific controller characteristic which is directed, for example, at a specific application of the converter circuit.

The reference signal $V_{ref,U1}$ in respect of the voltage U1 across the phase modules 1 may be generated by a superordinate control system for controlling the current $i_{u1}$ through the respective phase module 1, and therefore the method according to the present disclosure is subordinate to current control.

The apparatus according to the present disclosure for carrying out the method for operating the converter circuit includes a drive circuit 3, which serves to generate the drive signal S1, for each phase module 1. The drive circuit 3 is connected to the power semiconductor switches of the switching cell 2 of the phase module 1. According to the exemplary embodiment in FIG. 1, in the case of a phase module 1 with a plurality of switching cells 2, the drive circuit 3 is then connected to the power semiconductor switches of the switching cells 2 of the phase module 1. According to an exemplary embodiment of the present disclosure, in respect of each phase module 1, the sum of the reference signal $V_{ref,U1}$ in respect of the voltage U1 across the phase module 1 and of the voltage signal $V_L$ across the inductance 6 is supplied to the drive circuit 3 for the purpose of forming the drive signal S1. Furthermore, in respect of each phase module 1, a first calculation unit 4 is provided for forming the voltage signal $V_L$ across the inductance 6 from the intermediate setpoint value $\Delta i_{U1}$ of the current $i_{U1}$ through the phase module 1. The first calculation unit 4 forms the voltage signal $V_L$ across the inductance 6, for example, according to formula [1], from the intermediate setpoint value $\Delta i_{U1}$ of the current $i_{U1}$ through the phase module 1.

Furthermore, according to FIG. 1, for each phase module 1, a second calculation unit 5 is provided for forming the intermediate setpoint value $\Delta i_{U1}$ of the current $i_{U1}$ through the phase module 1 from the sum Usum1 of the voltages UC1 across the capacitive energy storage means of the switching cells 2 of the phase module 1 and from the sum voltage setpoint value $V_{ref,UC}$, with the intermediate setpoint value $\Delta i_{U1}$ of the current $i_{U1}$ through the phase module 1 being formed, for example, by means of formula [2].

The second calculation unit 5 additionally forms the intermediate setpoint value $\Delta i_{U1}$ of the current $i_{U1}$ through the phase module 1 from the predefinable controller function F, as shown by formula [2] in particular.

Figure 2:
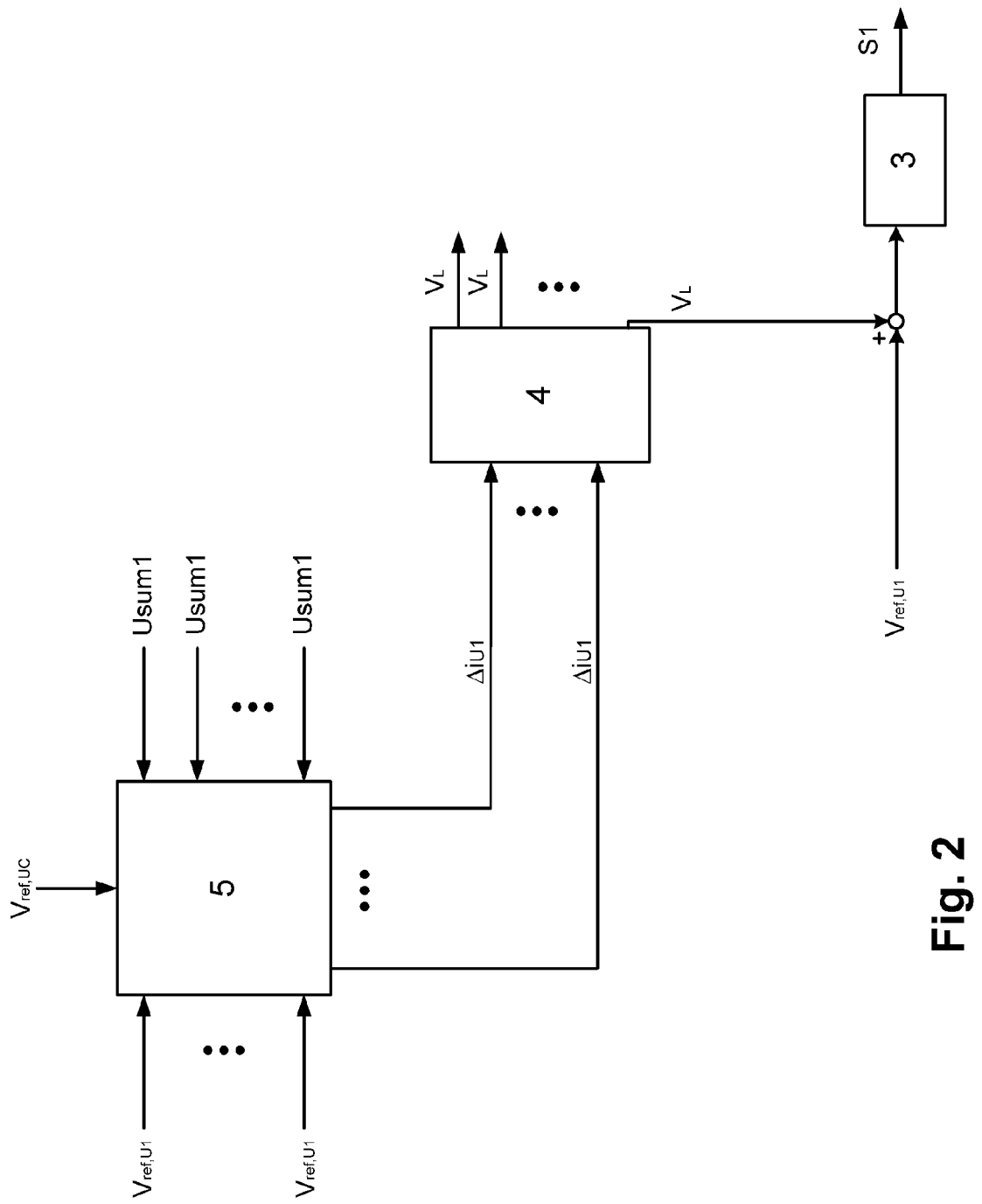
FIG. 2 shows an exemplary embodiment of an apparatus according to the present disclosure for operating a converter circuit, in which apparatus a method of the present disclosure for operating a converter circuit can be implemented.

An exemplary embodiment of the apparatus according to the disclosure in FIG. 1 is shown in FIG. 2. In contrast to FIG. 1, according to the embodiment in FIG. 2, a common first calculation unit 4 for forming the voltage signal $V_L$ across the inductance 6 of the respectively associated phase module 1 from the intermediate setpoint value $\Delta i_{U1}$ of the current $i_{U1}$ through the phase module 1 can be provided for all the phase modules 1. The voltage signals $V_L$ across the inductances 6 of the phase modules 1 are therefore advantageously formed centrally in a single unit. As illustrated in FIG. 2, the sums of the intermediate setpoint values $\Delta i_{U1}$ of the currents $i_{U1}$ through the phase modules 1 are supplied to the common first calculation unit 4 for this purpose. The common first calculation unit 4 then forms the voltage signal $V_L$ across the inductance 6 of the respectively associated phase module 1 from the respective sum of the intermediate setpoint values $\Delta i_{U1}$ of the current $i_{U1}$ through the respectively associated phase module 1. The common first calculation unit 4 forms the voltage signal $V_L$ across the inductance 6 of the respectively associated phase module 1 according to formula [1] in particular.

Furthermore, according to FIG. 2, for all the phase modules 1, a common second calculation unit 5 is provided for forming the intermediate setpoint value $\Delta i_{U1}$ of the current $i_{U1}$ through all the phase modules 1 from a sum Usum1 of the voltages UC1 across the capacitive energy storage means of the switching cells 2 of the phase modules 1 and from the sum voltage setpoint value $V_{ref,UC}$, with the intermediate setpoint value $\Delta i_{U1}$ of the current $i_{U1}$ through the phase modules 1 being formed, for example, by means of the following formula [3]:

$$\Delta \vec{i}_{U1} = V_{\sigma=0} \cdot V_{\sigma=0}^T \cdot F \cdot (V_{ref,UC} - \vec{U}\text{sum1}) \cdot \vec{V}_{ref,U1} \quad [3]$$

The current intermediate setpoint value $\Delta i_{U1}$ is therefore advantageously formed centrally in a single unit. It should be noted that formula [3] is illustrated as a vector equation and the current intermediate setpoint values $\Delta i_{U1}$ of the phase modules 1 are elements of the current intermediate setpoint value vector $\Delta \vec{i}_{u1}$, that the sums Usum1 of the phase modules 1 are elements of the sum voltage vector $\vec{U}\text{sum1}$, and that the reference signals $V_{ref,U1}$ are elements of the reference signal vector $\vec{V}_{ref,U1}$.

The common second calculation unit 5 additionally forms the intermediate setpoint value $\Delta i_{U1}$ of the current $i_{U1}$ through the phase modules 1 from a predefinable controller function F according to formula [3] in particular.

According to formula [3], the intermediate setpoint value $\Delta i_{U1}$ of the current $i_{U1}$ through the phase module 1 is additionally in each case formed, in line with the method, from a predefinable decoupling matrix V which serves to decouple the circulating currents through the phase modules 1 from the currents $i_u$ in the output phase connections U2, V2, W2. The current intermediate setpoint value $\Delta i_{U1}$ is mapped beforehand in a subspace which is orthogonal to those currents $i_U$ at the output connections U2, V2, W2 of the phase modules 9 which are not intended to be varied. A subspace of this kind and the decoupling matrix V which is required for mapping can be pre-calculated, for example, from a connection matrix T, with the singular value decomposition of T then being defined as follows:

$$T = U \Sigma V^*$$

where U is a unitary matrix, V* is the adjoint of the unitary matrix V and $\Sigma$ is a real matrix, with all the elements of $\Sigma$ on the other side of the main diagonal having to be equal to zero.

$V_{\sigma=0}$ are those gaps in V of which the singular value (the associated element in $\Sigma$) is equal to zero. $V_{\sigma=0}$ are said gaps in the decoupling matrix V which is a base of the subspace of the current intermediate setpoint values $\Delta i_{U1}$, which subspace is orthogonal to those currents $i_U$ at the output connections of the phase modules 9. $V^T_{\sigma=0}$ is then the transpose of $V_{\sigma=0}$.

For a converter circuit, in particular a direct converter circuit, for example according to FIG. 3, the connection matrix T can be set up as follows:

$$T = \begin{pmatrix} +1 & 0 & 0 & +1 & 0 & 0 & +1 & 0 & 0 \\ 0 & +1 & 0 & 0 & +1 & 0 & 0 & +1 & 0 \\ 0 & 0 & +1 & 0 & 0 & +1 & 0 & 0 & +1 \\ -1 & -1 & -1 & 0 & 0 & 0 & 0 & 0 & 0 \\ 0 & 0 & 0 & -1 & -1 & -1 & 0 & 0 & 0 \\ 0 & 0 & 0 & 0 & 0 & 0 & -1 & -1 & -1 \end{pmatrix}$$

and $V_{\sigma=0}$ can be set up, by way of example, as follows:

$$V_{\sigma=0} = \begin{pmatrix} 0.3800 & -0.2239 & 0.3535 & 0.3535 \\ -0.4316 & 0.3019 & -0.2754 & 0.3019 \\ 0.0515 & -0.071 & -0.0781 & -0.6554 \\ -0.5191 & -0.3609 & -0.1495 & -0.1495 \\ 0.5895 & -0.0791 & -0.2905 & -0.0791 \\ -0.0704 & 0.4400 & 0.4400 & 0.2287 \\ 0.1391 & 0.5847 & -0.2039 & -0.2039 \\ -0.1580 & -0.2228 & 0.5659 & -0.2228 \\ 0.0189 & -0.3619 & -0.3619 & 0.4268 \end{pmatrix}$$

The above-mentioned formation of the current intermediate setpoint values $\Delta i_{U1}$ according to formula [3] advantageously does not cause any change in the currents $i_u$ at the output connections of the phase modules 9, that is to say these currents $i_u$ are not influenced.

According to FIG. 2, the common second calculation unit 5 then additionally forms the intermediate setpoint value $\Delta i_{U1}$ of the current $i_{U1}$ through the phase modules 1 from the predefinable decoupling matrix V, in particular according to formula [3]. The current intermediate setpoint values $\Delta i_{U1}$ are therefore decoupled by the matrix V at the same time.

Overall, it can be seen that the apparatuses according to the disclosure, in particular shown in FIG. 1 and FIG. 2, for carrying out the method according to the disclosure for operating the converter circuit can be realized in a very simple and cost-effective manner since the circuit complexity can be kept extremely low and, in addition, said apparatus is made up of only a small number of components. Therefore, the method according to the disclosure can be carried out by means of these apparatuses in a particularly simple manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Phase module
2 Switching cell

3 Drive circuit
4 First calculation unit
5 Second calculation unit
6 Inductance

What is claimed is:

1. A method for operating a converter circuit, wherein the converter circuit includes n input phase connections and p output phase connections, where n≥2 and p≥2, and (n·p) two-pole switching cells for switching at least one positive and at least one negative voltage between the poles, wherein each output phase connection is connected in series to each input phase connection by means of a switching cell, respectively, and each switching cell having drivable bidirectional power semiconductor switches with a controlled unidirectional current guidance direction, and a capacitive energy storage means, wherein the method comprises:
    driving the power semiconductor switches of the switching cells by means of a drive signal;
    connecting at least one inductance into each series connection, with a switching cell together with an inductance in each case forming a phase module;
    for each phase module, forming the drive signal from a reference signal in respect of a voltage across the phase module and from a voltage signal across the inductance; and
    forming the voltage signal across the inductance from an intermediate setpoint value of the current through the phase module.

2. The method as claimed in claim 1, wherein:
    each switching cell includes four drivable bidirectional power semiconductor switches with a controlled unidirectional current guidance direction;
    the power semiconductor switches are connected in the manner of a bridge circuit, and a capacitive energy storage means which is connected parallel to the bridge circuit of the power semiconductor switches;
    the phase module includes at least one further two-pole switching cell, which is connected into the series connection, for switching at least one positive and at least one negative voltage between the poles; and
    the intermediate setpoint value of the current through the phase module is formed from a sum of the voltages across the capacitive energy storage means of the switching cells of the phase module and from a sum voltage setpoint value.

3. The method as claimed in claim 2, wherein the intermediate setpoint value of the current through the phase module is formed from a predefinable controller function.

4. The method as claimed in claim 3, wherein the intermediate setpoint value of the current through the phase module is formed from a predefinable decoupling matrix which serves to decouple circulating currents through the phase modules for the currents in the output phase connections.

5. An apparatus for operating a converter circuit, wherein the converter circuit includes n input phase connections and p output phase connections, where n≥2 and p≥2, and (n·p) two-pole switching cells for switching at least one positive and at least one negative voltage between the poles, wherein each output phase connection is connected in series to each input phase connection in each case by means of a switching cell, respectively, and each switching cell has drivable bidirectional power semiconductor switches with a controlled unidirectional current guidance direction, and a capacitive energy storage means, wherein the apparatus comprises:
    a drive circuit configured to generate a drive signal, the drive circuit being connected to the power semiconductor switches of the switching cell;
    at least one inductance connected into each series connection, with a switching cell together with an inductance in each case forming a phase module, and, in respect of each phase module, a sum of a reference signal in respect of a voltage across the phase module and of a voltage signal across the inductance being supplied to the drive circuit for forming the drive signal; and
    for each phase module, a first calculation unit for forming the voltage signal across the inductance from an intermediate setpoint value of the current through the phase module.

6. The apparatus as claimed in claim 5, wherein:
    each switching cell includes four drivable bidirectional power semiconductor switches with a controlled unidirectional current guidance direction;
    the power semiconductor switches are connected in the manner of a bridge circuit, and a capacitive energy storage means which is connected parallel to the bridge circuit of the power semiconductor switches;
    the phase module includes at least one further two-pole switching cell, which is connected into the series connection, for switching at least one positive and at least one negative voltage between the poles; and
    for each phase module, the apparatus includes a second calculation unit for forming the intermediate setpoint value of the current through the phase module from a sum of the voltages across the capacitive energy storage means of the switching cells of the phase module and from a sum voltage setpoint value.

7. The apparatus as claimed in claim 6, wherein the second calculation unit is configured to form the intermediate setpoint value of the current through the phase module from a predefinable controller function.

8. An apparatus for operating a converter circuit, wherein the converter circuit includes n input phase connections and p output phase connections, where n≥2 and p≥2, and (n·p) two-pole switching cells for switching at least one positive and at least one negative voltage between the poles, each output phase circuit being connected in series to each input phase connection in each case by means of a switching cell, respectively, and each switching cell having drivable bidirectional power semiconductor switches with a controlled unidirectional current guidance direction, and a capacitive energy storage means, wherein the apparatus comprises:
    a drive circuit configured to generate a drive signal, the drive circuit being connected to the power semiconductor switches of the switching cell;
    at least one voltage connected into each series connection, with a switching cell together with an inductance in each case forming a phase module, and, in respect of each phase module, the sum of a reference signal in respect of the voltage across the phase module and of a voltage signal across the inductance being supplied to the drive circuit for forming the drive signal; and
    for all the phase modules, a common first calculation unit for forming the voltage signal across the inductance of the respectively associated phase module from an intermediate setpoint value of the current through the phase module.

9. The apparatus as claimed in claim 8, wherein:
    each switching cells includes four drivable bidirectional power semiconductor switches with a controlled unidirectional current guidance direction;
    the power semiconductor switches are connected in the manner of a bridge circuit, and a capacitive energy storage means which is connected parallel to the bridge circuit of the power semiconductor switches;

the phase module additionally has at least one further two-pole switching cell, which is connected into the series connection, for switching at least one positive and at least one negative voltage between the poles, and, for all the phase modules, a common second calculation unit for forming the intermediate setpoint value ($\Delta i_{U1}$) of the current ($i_{U1}$) through all the phase modules from a sum (Usum1) of the voltages across the capacitive energy storage means of the switching cells of the phase modules and from a sum voltage setpoint value ($V_{ref,UC}$) is provided.

10. The apparatus as claimed in claim 9, wherein the common second calculation unit is configured to form the intermediate setpoint value of the current through the phase modules from a predefinable controller function.

11. The apparatus as claimed in claim 10, wherein the common second calculation unit is configured to form the intermediate setpoint value of the current through phase modules from a predefinable decoupling matrix which decouples circulating currents through the phase modules from the currents in the output phase connections.

\* \* \* \* \*